April 7, 1964  N. R. BROWN ETAL  3,128,217
TAPE DISPENSING APPARATUS
Filed June 7, 1961  3 Sheets-Sheet 2

INVENTORS
Norman R. Brown,
John A. Gustairs &
BY Clarence E. Herider

ATTORNEY

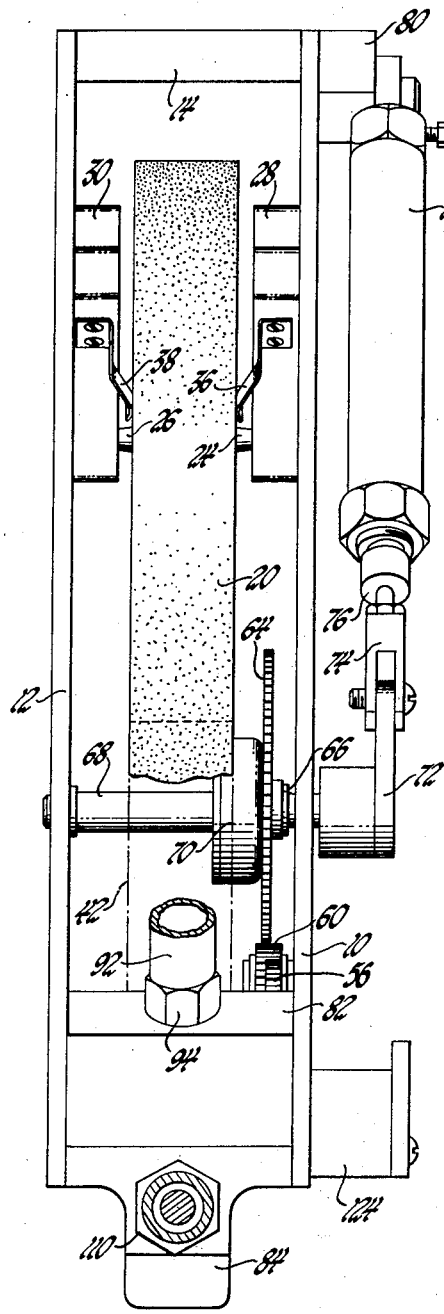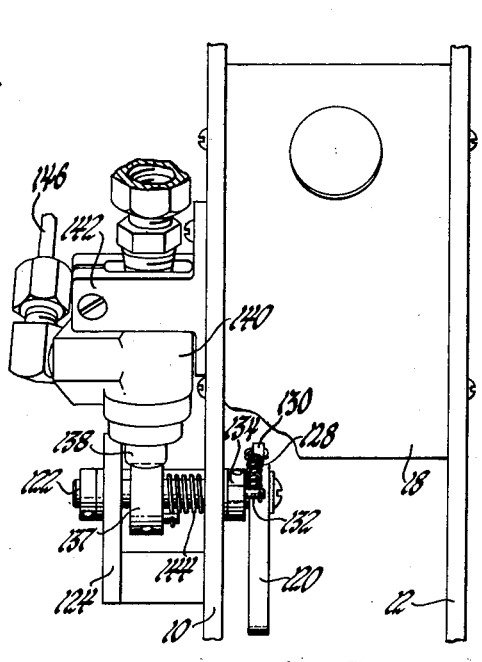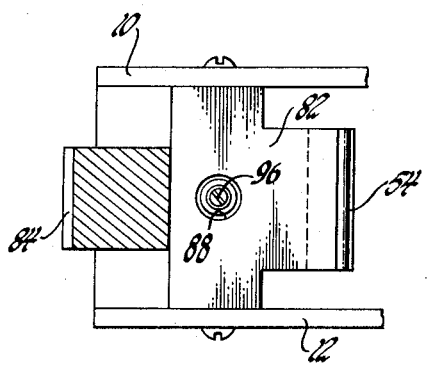

United States Patent Office 3,128,217
Patented Apr. 7, 1964

3,128,217
TAPE DISPENSING APPARATUS
Norman R. Brown, Pontiac, John A. Gustairs, Royal Oak, and Clarence E. Herider, Dearborn, Mich., assignors to General Motors Corporation, Detroit, Mich., a corporation of Delaware
Filed June 7, 1961, Ser. No. 115,454
3 Claims. (Cl. 156—355)

This invention relates to tape dispensing apparatus and, more particularly, to apparatus for automatically dispensing, wrapping and securing a length of tape around an article.

Identification tags comprising colored adhesive tapes are used in many industrial applications for quick identification of various parts during manufacture and during assembly operations. In many assembly operations, parts are constructed from a plurality of wire elements or the like which require quick and certain identification to enable a workman to properly assemble the parts. For example, in the assembly of spring elements in seats or the like, a plurality of individual spring elements must be assembled in a predetermined manner. If the spring elements are provided with colored identification tags, the assembly workman can easily ascertain which of the wire elements is to be placed in a particular position. Another exemplary application of the use of tape-type identification tags is in the assembly of electrical components which have a plurality of wires grouped in a common container or covering. In order to mark the individual wires for identification during assembly operations, a low cost identification tag which may be easily and quickly secured to a wire is desirable.

The purpose of this invention is to provide apparatus for automatically dispensing and wrapping identification means around wire-like elements. Another purpose of this invention is to provide means to apply tape-type identifying tags or the like to a workpiece and to sever and secure the identification tag on the workpiece in a single continuous automatic operation. Still another purpose of this invention is to provide new and improved tape dispensing apparatus which automatically dispenses a predetermined length of tape, severs the tape, and wraps the tape around a workpiece in secured relation relative thereto.

Other objects and advantages of the present invention will become apparent by reference to the following detailed description and the accompanying drawing wherein:

FIGURE 4 is a sectional view taken along the line 4—4 in FIGURE 1;

FIGURE 5 is a sectional view taken along the line 5—5 in FIGURE 1; and

FIGURE 6 is a sectional view taken along the line 6—6 in FIGURE 1.

Figure 1:
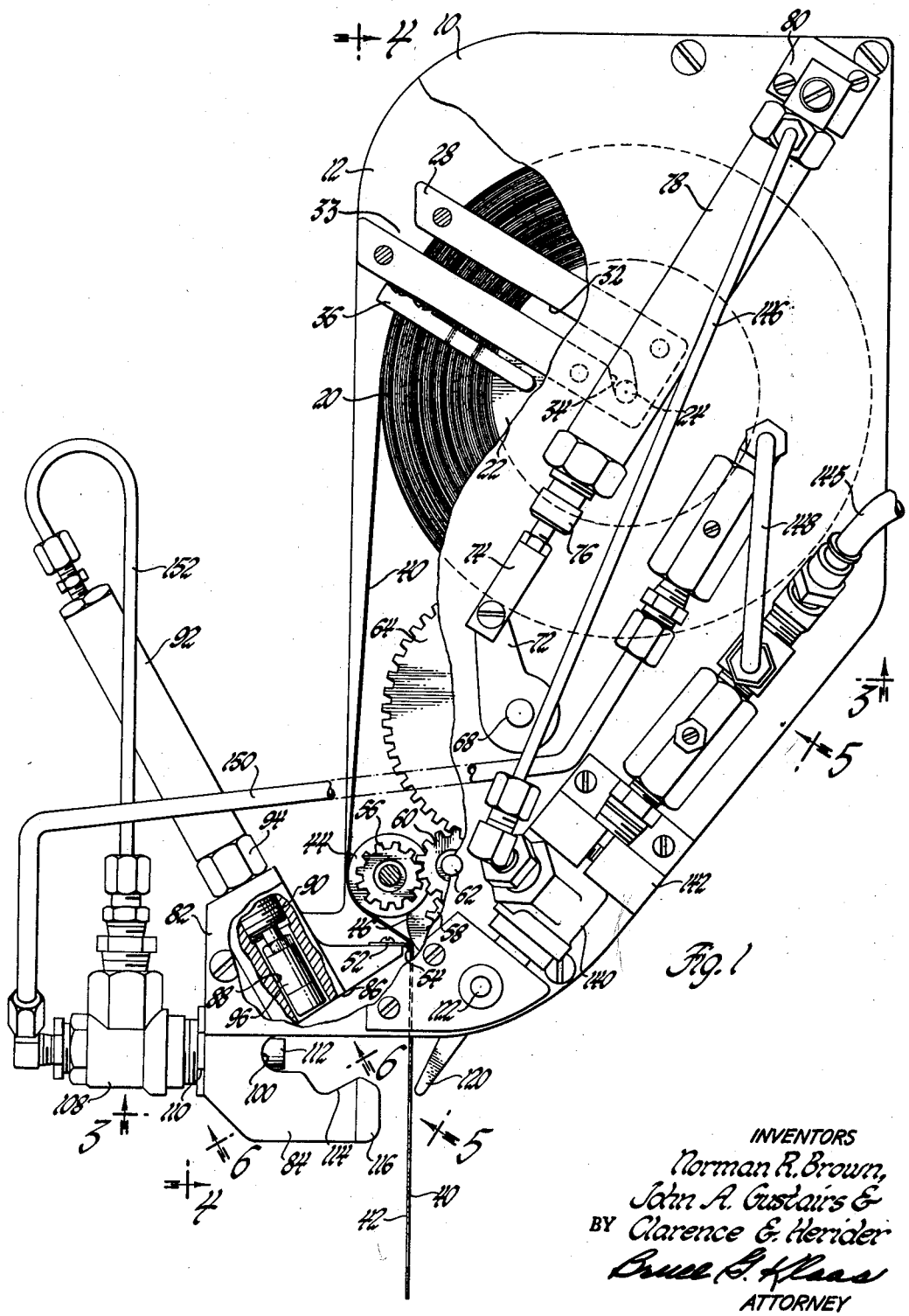
FIGURE 1 is a side elevational view, partly in section, of apparatus embodying the present invention.

Referring now to the drawings, an illustrative embodiment of the present invention is shown to comprise a frame having spaced side plates 10, 12 which are separated by a plurality of spacer plates 14, 16, 18. The frame may be provided with handle means (not shown) if the apparatus is to be used as a portable tool or the frame may be rigidly secured on a work bench or other support surface (not shown).

Figure 2:
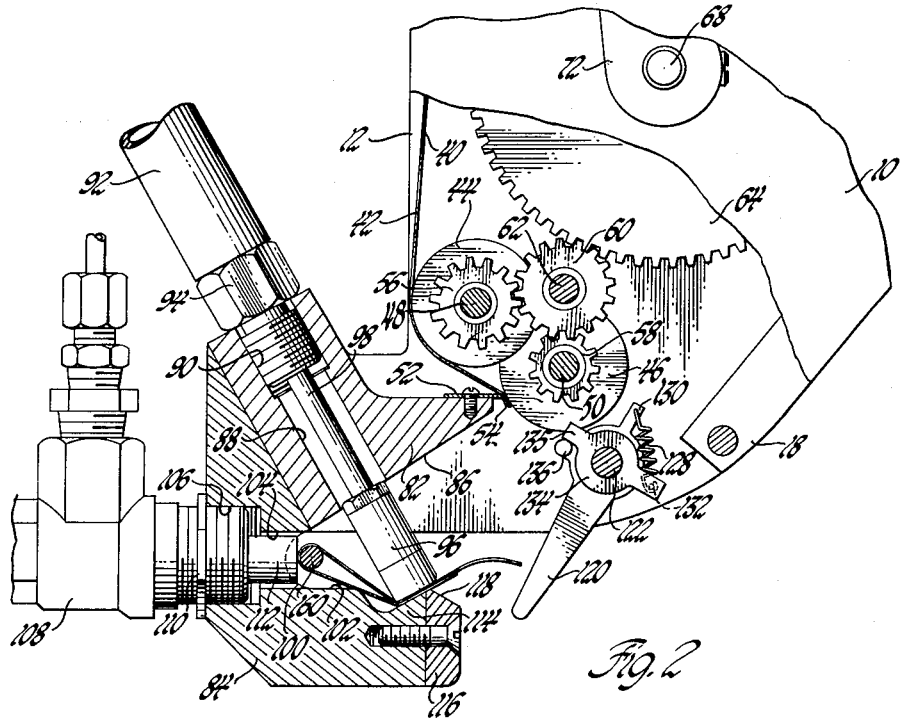
FIGURE 2 is an enlarged view, partly in section, of a portion of the apparatus shown in FIGURE 1.
Figure 3:
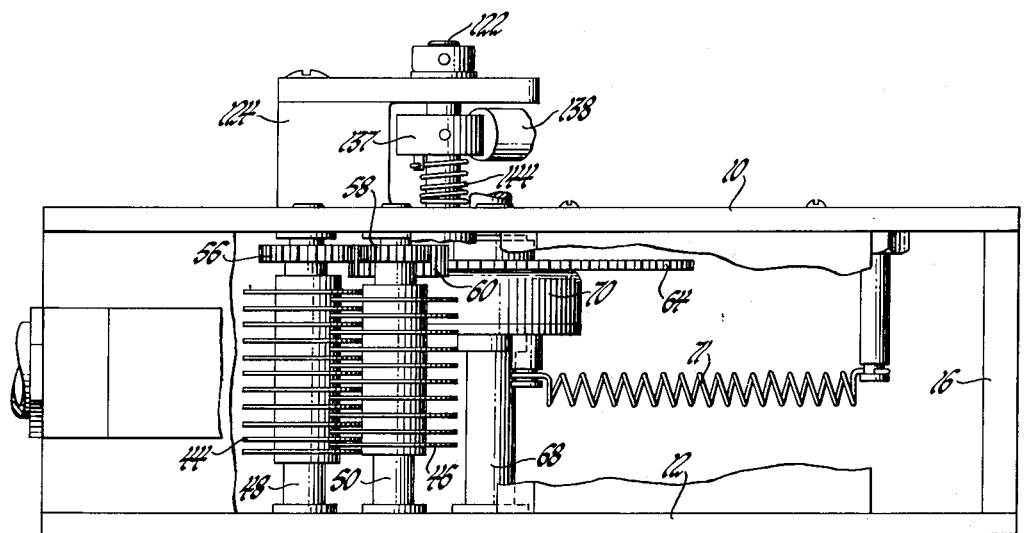
FIGURE 3 is a sectional view taken along the line 3—3 in FIGURE 1.

A roll of colored tape 20 is mounted on a reel 22 having outwardly extending support pins 24, 26 and is rotatably supported between the side plates 10, 12 by a pair of bracket units 28, 30 which are secured to the side plates. Each of the bracket units is provided with a downwardly extending loading slot 32 which terminates at the upper end in a loading port 33 and terminates at the lower end in a bearing seat 34 which is formed by a vertically extending portion of the slot. The support pins 24, 26 are rotatably received on the bearing seats 34 and the width of the slot 32 is such as to permit the roll of colored tape to be slidably moved down the slot to the bearing seat. A pair of flexible guide spring arms 36, 38 are secured to the lower surfaces of the bracket units and extend inwardly therebetween to laterally space the roll of tape. The guide spring arms also serve as a brake and prevent free inertial rotation of the roll of tape. The roll of tape is provided with an adhesive coated inner surface 40 and the end portion 42 of the roll is adapted to extend downwardly for engagement with a pair of feed rollers 44, 46. Each of the feed rollers comprises a plurality of relatively thin disc elements which are interspaced relative to one another and supported on spaced parallel shafts 48, 50 as shown in FIGURE 3. The edges of the disc elements of the rollers engage the adhesive surface 40 of the tape end 42 and unwind the tape from the roll during counterclockwise rotation as viewed in FIGURE 1. The guide spring arms stop rotation of the roll of tape whenever the feed rollers are deactivated so that there is no overtravel and only a predetermined length of tape is unwound from the roll during movement of the feed rollers. The end of the tape 42 is directed downwardly over a guide plate 52 which is provided with a sharp cutting edge 54 along its lower surface as shown in FIGURE 2.

The feed rollers 44, 46 are driven by gears 56, 58 which are fixably secured to one end of each of the shafts 48, 50 and are drivingly engaged with a drive gear 60 rotatably mounted on a shaft 62. The gear 60 is drivingly engaged by a gear wheel 64 which is rotatably mounted by a sleeve 66 on a shaft 68 as shown in FIGURE 4. The gear wheel 64 is connected in a conventional manner to a conventional one-way clutch unit 70 through which the gear wheel is rotatably driven by the shaft 68. A return spring 71 is connected between the clutch and the frame in any suitable manner. A crank 72 is secured to one end of the shaft 68 and is connected through a clevis 74 to a piston rod 76 of a power cylinder 78 which is secured to the side plate 10 by bracket means 80.

Tape wrapping and severing means are provided at the lower end of the frame and comprise a support block portion 82 which is fixably secured between the side plates and from which a jaw portion 84 extends. The support block portion 82 is provided with an inclined inner surface 86 through which a guide hole 88 extends at substantially right angles as shown in FIGURES 1 and 2. The guide hole 88 terminates in a threaded counterbore 90 within which a power cylinder 92 is secured by a threaded coupling 94. Clamping jaw means is provided by a cylinder 96 secured to the end of a piston rod 98 reciprocably controlled by the cylinder 92. The jaw portion 84 is provided with an arcuate recess portion 100 which terminates at one end in alignment with the surface 86 and at the other end with a substantially horizontal surface 102. A port 104 intersects the arcuate recess 100 and terminates outwardly in a threaded counterbore 106 within which a conventional control valve 108 is secured by a threaded coupling 110. An actuating finger 112 of the control valve 108 extends, in its normal unactuated position, through the port 104 and into the recess provided by the arcuate surface 100 as shown in FIGURE 2. A clamping jaw seat 114 is provided on the end of the jaw portion 84 by a downwardly inclined surface which is substantially parallel to the surface 86 and located at substantially right angles to the cylinder rod 98 so that the end of the cylinder 96 seats on the surface 114. A guide plate 116 is secured to the end of the jaw portion 84 and provided with a beveled guide surface 118.

A tape dispensing control lever 120 extends downwardly into the jaw area defined by the support block 82 and the jaw block 84 and is fixedly secured to a rotatable shaft 122 supported on a bracket 124 which is secured to the side plate 10. The tape dispensing control lever 120 is movable forwardly and rearwardly from a central position, shown in FIGURE 2 by rotation of the shaft 122. A spring 128 for centrally positioning the control lever is secured at one end to a flange 130 on the control lever and at the other end to a pin 132 mounted on a collar 134 fixably secured relative to the side plate 10. A locating stop 135 is provided on the collar and adapted to engage a pin 136 on the control lever. When the control lever is moved away from the jaw area, as seen in FIGURE 2, the spring 128 returns it to the central position. Referring now to FIGURES 3 and 5, an actuating dog 137 is fixed to the shaft 122 and adapted to engage the actuating finger 138 of a conventional control valve 140 which is secured to the side plate 10 by a bracket 142. A torsion spring 144 biases the control lever away from the jaw area so as to return the control lever to the central position after movement thereof toward the jaw area.

A source of high pressure air (not shown) is connected through a conduit 145, the valve 140, and a conduit 146 to the cylinder 78. The cylinder 92 is connected to the high pressure line 144 through a conduit 148, a conduit 150, the valve 108, and a conduit 152. The valves 108 and 140 are conventional and connect the cylinders 78 and 92 to exhaust in the closed position thereof. When the valves are actuated, the cylinders are connected to the high pressure source.

*Operation*

In operation, a wire element 160 which is to be provided with an identification tag is positioned adjacent the jaw area as shown in FIGURE 1. The tape dispensing control 120 blocks the path of movement of the wire 160 into the jaw area. The end 42 of the tape extends downwardly over the guide plate 52 and into the jaw area behind the control lever. The jaw head 96 is in its retracted position within the opening 88. The wire 160 is forced inwardly against the control lever 120 and causes the control lever to be rotated toward the jaw area and upwardly and out of the way. It should be noted that the control lever is offset relative to the end of the tape so that there is no interference therebetween. The wire is engaged with the adhesive surface 40 of the end 42 and carries the end of the tape inwardly into the jaw area. The beveled surface 118 on the guide plate 116 guides the wire 160 into the jaw area. When the wire engages the adhesive surface 40, the tape adheres thereto and is moved inwardly therewith. The distance between the arcuate surface 100 and the cutting edge 54 of the guide plate 52 is such as compared to the length of the tape between the cutting edge 54 and the end of the tape, as viewed in FIGURE 1, to stretch the tape across the cutting edge and sever the end of the tape. The wire is moved into the arcuate recess 100 and against the actuating finger 112 of the valve 108. When the wire is seated in the arcuate recess and has actuated the valve 108, high pressure air passes from the inlet conduit 144 through the conduits 148, 150, the valve 108, and the conduit 152 to the power cylinder 92. The piston in the cylinder is driven downwardly to extend the piston rod 98 and the jaw head 96. Downward movement of the jaw head 96 compresses the ends of the severed tape against the surface 114 to cause the facing adhesive surfaces thereof to be engaged and to adhere to one or another. When the wire 160 is moved outwardly from the arcuate surface 100, the actuating finger 112 returns to its original position and air in the line 152 and the cylinder 92 is exhausted.

The cylinder is deactivated to cause the jaw head 96 to be retracted into the guide hole 88. As the wire 160 is moved outwardly from the jaw area, it engages the control lever 120 which is moved outwardly away from the jaw area thereby. Outward movement of the control lever causes the actuating dog 137 to be moved into engagement with the actuating finger 138 of the control valve 140. The control valve 140 is actuated to permit high pressure air to pass from the inlet conduit 144 through the valve 140, and the conduit 146 to the cylinder 78. The cylinder 78 is thereby actuated to extend the piston rod 76 and rotate the crank 72 and the shaft 68. In this manner, the gear wheel 64 is driven through the one-way clutch 70 to drive the gears 56, 58, 60 and turn the feed rollers 44, 46. The discs on the rollers engage the adhesive surface 40 of the tape and dispense a predetermined length of tape over the guide plate 52 and downwardly into the jaw area. When the wire 160 clears the control lever 120, the control lever is returned to the neutral position to close the valve 140 to the inlet conduit 144 and open the line 146 to exhaust. The power cylinder 78 returns the piston rod 76, the crank arm 72, and the shaft 68 to the original position. The one-way clutch 70 rotates relative to the gear wheel 64 so that there is no movement of the gear wheel during the retraction of the piston rod 76. At this time, the apparatus is ready for the application of another strip of adhesive tape to another wire element and a cycle of operation has been completed.

Obvious modifications in the details of construction and arrangement of the various parts are intended to be within the scope of this invention. For example, the details of construction of the tape dispensing means, the frame, and the power actuating means may be varied as desired. Accordingly, the scope of this invention, as defined by the appended claims, is intended to include equivalents, except insofar as limited by the prior art.

The invention claimed is:

1. Tape dispensing and applying apparatus for fastening identification tape on a workpiece and comprising support means, a roll of tape rotatably supported by said support means, means to dispense a predetermined length of said tape, jaw means associated with said support means and defining a jaw cavity, said length of said tape extending into said jaw cavity, seat means provided for a workpiece in said jaw means, said length of tape extending in front of said seat means to be engaged by and carried with said workpiece into said seat, means to sever said length of tape from said roll as said workpiece is moved into said seat, and jaw means actuable by movement of said workpiece onto said seat to secure the ends of said tape to one another around said workpiece.

2. Apparatus for applying identifying tape to a workpiece and comprising a frame defined by parallel side plates, support means to rotatably support a roll of identifying adhesive tape between said plates, jaw means supported between said plates and spaced from said support means, a tape applying cavity formed by said jaw means and terminating in a seat adapted to receive a workpiece, tape severing and guide means having a severing portion and a guide portion located adjacent said jaw means to guide a length of tape from said roll across the front of said cavity, tape dispensing means to unwind a predetermined length of tape from said roll and position said length of tape in front of said cavity for engagement with said workpiece during movement thereof into said cavity and onto said seat, said seat being spaced from said guide and severing means a sufficient distance to cause severance of the end of said tape during movement into said cavity and onto said seat with said workpiece by pulling said end of said tape across the severing portion of said severing and guide means, a movable jaw provided in said jaw means and located adjacent said seat, control means actuable by said workpiece on said seat to actuate said movable jaw into engagement with the severed ends of said tape to clamp one to the other, said control means being deactivated by movement of said workpiece out of said seat to cause retraction of said movable jaw, and tape dispensing control means located adjacent said cavity and positioned for engagement with said workpiece during removal thereof from said cavity, and said tape dispensing control means being connected to said tape dispensing means to cause another length of said tape to be positioned across the front of said cavity upon removal of said workpiece from therewithin.

3. Tape dispensing means for dispensing, severing, and wrapping identification tape about a length of wire or the like and comprising support means for rotatably supporting a roll of tape having an adhesive inner surface and a colored surface for identification purposes, tape applying jaw means defined by an inwardly extending recess, said recess terminating in a seat contoured to receive said wire, means to automatically position a length of said tape across the front of said recess with the adhesive surface facing outwardly for engagement with the wire and the colored surface facing inwardly for engagement with the jaw means, said jaw means including a clamping surface positioned on one side of said seat and along one surface of said recess and a movable jaw positioned on the other side of said seat and along an opposite surface of said recess, said wire being movable into engagement with the adhesive surface of said tape and inwardly into said recess between said jaw means and onto said seat, severing means to sever said length of said tape as said wire is moved onto said seat, control means operative by said wire on said seat to actuate said jaw means and move said movable jaw into engagement with said support surface, said length of tape being positioned in the path of movement of said movable jaw and the ends of said tape surrounding said wire being clamped between said movable jaw and said surface to secure the severed length of tape around said wire, said control means being actuated by movement of said wire element away from said seat to retract said jaw means, and tape dispensing control means actuated by removal of said wire from said jaw means to dispense another length of adhesive tape over said recess.

References Cited in the file of this patent

UNITED STATES PATENTS

| | | |
|---|---|---|
| 2,278,533 | Desautels | Apr. 7, 1942 |
| 2,322,605 | Verdechia | June 22, 1943 |
| 2,346,142 | Anderson | Apr. 11, 1944 |
| 2,543,323 | Marsh | Feb. 27, 1951 |
| 2,781,932 | Hittie et al. | Feb. 19, 1957 |
| 2,986,298 | Meyer | May 30, 1961 |
| 3,017,313 | Lagasse | Jan. 16, 1962 |